US005552475A

United States Patent [19]
Sundararaman et al.

[11] Patent Number: 5,552,475
[45] Date of Patent: Sep. 3, 1996

[54] WATERBORNE POLYESTERS HAVING IMPROVED SAPONIFICATION RESISTANCE

[75] Inventors: Padmanabhan Sundararaman; Ronald R. Ambrose, both of Hampton Township; Douglas R. Camp, Gibsonia; Truman F. Wilt, Clinton, all of Pa.

[73] Assignee: PPG Industries, Inc., Pittsburgh, Pa.

[21] Appl. No.: 130,893

[22] Filed: Oct. 4, 1993

[51] Int. Cl.$^6$ .......................................................... C08J 3/02
[52] U.S. Cl. .......................... 524/608; 528/272; 528/302; 528/307; 525/437; 524/601; 524/604
[58] Field of Search ..................................... 528/272, 302, 528/307; 525/437; 524/601, 604, 608

[56] References Cited

U.S. PATENT DOCUMENTS

| | | | |
|---|---|---|---|
| Re. 30,660 | 6/1981 | Laganis | 524/598 |
| 3,936,404 | 2/1976 | Ishizuka et al. | |
| 4,130,520 | 12/1978 | Thomas et al. | |
| 4,172,822 | 10/1979 | Patzschke | 524/539 |
| 4,248,745 | 2/1981 | Laganis | |
| 4,346,044 | 8/1982 | Dhein et al. | 554/1 |
| 4,456,729 | 1/1984 | Dhein et al. | 524/542 |
| 4,576,990 | 3/1986 | Mazaki et al. | 524/602 |
| 4,588,668 | 5/1986 | Yasuda et al. | 430/109 |
| 4,868,085 | 9/1989 | Aita | 430/126 |
| 5,053,483 | 10/1991 | Knox | 528/295.5 |
| 5,096,959 | 3/1992 | Jones et al. | 524/600 |
| 5,137,965 | 8/1992 | Knox | 524/601 |

FOREIGN PATENT DOCUMENTS

| | | |
|---|---|---|
| 987043 | 4/1976 | Canada . |
| 0023979 | 2/1981 | European Pat. Off. . |
| 3046586 | 12/1980 | Germany . |
| 1095953 | 12/1967 | United Kingdom . |

OTHER PUBLICATIONS

"Water Based Coatings with Excellent Saponification Stability", H. Blum, P. Hohlein, J. Meixner, Bayer A.-G. Krefeld Urdingen, pp. 45 thru 56.

*Primary Examiner*—Samuel A. Acquah
*Attorney, Agent, or Firm*—Dennis G. Millman; Paul S. Chirgott

[57] ABSTRACT

Substituted polycarboxylic acids or substituted anhydrides as acidifying agents stabilize a waterborne polyester from saponification, provided: (a) the acidification is carried out to an extent sufficient to provide an acid number of at least 40 milligrams KOH per gram of polyester resin; and (b) the substitution on the polycarboxylic acid or anhydride is either an alkenyl group having at least four carbon atoms or a cyclic group in which the ring is not aromatic. The relatively high acid number renders the polyester dispersible in water without the need to rely on surfactants.

16 Claims, No Drawings

WATERBORNE POLYESTERS HAVING IMPROVED SAPONIFICATION RESISTANCE

BACKGROUND OF THE INVENTION

The invention is directed to water dispersible or water soluble polyesters that may be used as binders in coating compositions and the like. In particular, the invention improves the stability of polyesters in aqueous media.

It is known to render polyesters dispersible in water by reacting hydroxyl functionality on a polyester with a polycarboxylic acid or an anhydride, thereby producing half-esters that provide carboxyl sites on the polyester. These carboxyl sites are then neutralized with a base such an amine, hydroxide, or carbonate to render the polyester compatible with water. Such an approach is disclosed in U.S. Pat. No. 4,576,990 (Mazaki et al.).

A known difficulty with such waterborne polyesters is that the presence of the base, which is necessary for solubilization, exposes the polyester to saponification reactions, whereby the half-esters may be cleaved from the polyester. As the saponification progresses over a period of time, a polyester that was initially stable in an aqueous medium may gradually lose its stability, and the product may thereby become unsuitable for its intended purpose. Therefore, the prior art has attempted to find ways to stabilize waterborne polyesters against saponification.

Blum, Hohlein, and Meixner, in an article titled "Water Based Coatings with Excellent Saponification Stability," Advanced Organic Coating Science Technology Series, Vol. 11, pages 45–56, hypothesized that saponification of half-ester groups was internally catalyzed by the proximity of the carboxyl group, an effect termed the "anchimeric effect." The authors report several attempts to prevent this anchimeric effect in polyesters, one of which involved the use of substituted succinic acids as the acidifying agent. Although a favorable suppression of the anchimeric effect was found by using substituted succinic acids, it was concluded that "the saponification has also not been improved to such an extent that storage-stable lacquers in aqueous form could be manufactured on an acceptable basis." It may be noted that the initial acid number of the polyesters acidified with substituted succinic acid was 20.7 or 20.8 milligrams KOH per gram of resin.

Instead of acidifying the polyester, another approach taken in the prior art to make waterborne polyester coatings is to employ surfactants that permit the polyester to be dispersed in water. Such an approach is generally less desirable because the presence of the surfactant in the cured coating tends to reduce the water resistance of the coating.

It would be highly desirable to provide a coating that includes polyester as the primary binder resin, that does not require substantial amounts of surfactant, and which is resistant to saponification.

SUMMARY OF THE INVENTION

It has now been found that the use of substituted polycarboxylic acids or substituted anhydrides as an acidifying agent can successfully stabilize a waterborne polyester from saponification, provided that: (a) the acidification is carried out to an extent sufficient to provide an acid number of at least 40 milligrams KOH per gram of polyester resin; and (b) the substitution on the polycarboxylic acid or anhydride is an alkenyl group having at least four carbon atoms. The relatively high acid number renders the polyester dispersible in water without the need to rely on surfactants, thereby providing the cured coating with good water resistants. In preferred embodiments the acid number is sufficiently high (e.g., greater than 50 milligrams KOH per gram of resin) to render the polyester fully soluble in water with no surfactant. The high acid number permits substantial amounts of surfactant to be avoided. Surprisingly, it has been found that at these high acid numbers, saponification inhibiting action of the substitution on the polycarboxylic acid or anhydride is effective.

DETAILED DESCRIPTION

The waterborne polyesters of the present invention are particularly useful as the binder constituent in coating compositions. The reaction of polycarboxylic acids (or anhydrides) and polyols to make polyesters suitable for coatings is well known in the art. The reaction may be carried out in organic solvent, and the polyester may initially be hydrophobic. A sufficient excess of polyol is provided to yield a polyester having hydroxyl groups with which an acidifying agent may be subsequently reacted so as to render the polyester dispersible or soluble in water upon neutralization.

The solvent-based polyesters are prepared from the reaction of a polyol with a polycarboxylic acid, a polycarboxylic anhydride, or a lower alkyl ester. Both cyclic or acyclic polyols or mixtures thereof may be used. Examples of suitable polyols include 1,4-cyclohexanediol, 1,4-cyclohexanedimethanol, propylene glycol, diethylene glycol, 1,4-butanediol, neopentyl glycol, 1,6-hexanediol, trimethylpentanediol and dipropylene glycol, or "Dimer Diol," a $C_{36}$ diol available from Henkel Emery Company. Trimethylol propane or glycerol may be used in limited quantities. Epoxy compounds may also be used, and particularly useful for making low molecular weight polyesters is propylene oxide.

In addition, one or more polycarboxylic acids (or the corresponding anhydrides, if available) are used in the preparation of the polyester. These polycarboxylic acids may be cyclic, acyclic or a mixture thereof. Esters, particularly methyl esters of these acids may also be used as reactants from which the polyesters may be formed by transesterification. Suitable cyclic polycarboxylic acids include orthophthalic acid, isophthalic acid, terephthalic acid, hexahydrophthalic acid, methylhexahydrophthalic acid, and cyclohexyldicarboxylic acid (or dimethylcyclohexyldicarboxylate). The acyclic polycarboxylic acids with a carbon number range between 2 and 36 may also be employed, for example, oxalic acid, malonic acid, succinic acid, glutaric acid, adipic acid, suberic acid, azelaic acid, sebacic acid, undecanedioic acid, dodecanedioic acid, fumaric acid, maleic acid, and "Dimer Acid, a $C_{36}$ diacid available from Henkel Emery Company.

In the condensation polymerization reaction of the polyol with the polycarboxylic acid to produce the initial polyester, the equivalent ratio of hydroxyl groups to carboxylic groups is maintained greater than 1.0, preferably 6:1 to 1.5:1, most preferably 4.5:1 to 2.5:1, in order to provide hydroxyl functionality on the polyester. This hydroxyl functionality is subsequently partially reacted with an acidifying agent. Some hydroxyl functionality remains after acidification in order to provide reaction sites for curing with a crosslinking agent such as melamine after the coating composition has been applied onto a substrate. Alternatively, all of the hydroxyl functionality may be reacted, in which case a different curing mechanism may be employed, such as oxidative cure, radiation cure, or crosslinking carboxyl groups with hydroxyalkylamides.

The acidifying agent may be one or more substituted polycarboxylic acid or, preferably, substituted anhydride, wherein the substitution is selected from the group consisting of: alkenyl groups having at least four carbon atoms, and cyclic groups in which the ring is not aromatic. A suitable category of acidifying agents for use in the present invention are the alkenyl substituted succinic acid anhydrides, for example, isobutenyl succinic acid and octenyl succinic acid anhydride. Examples of cyclic substituted acidifying agents are hexahydrophthalic anhydride and tetrahydrophthalic anhydride. The anhydrides are preferred because at this stage they can react with the hydroxyl groups at lower temperatures to selectively yield the acid ester.

Although the principles of the present invention are not limited to polyesters having particular molecular weights, the preferred embodiments intended for use in waterborne coating compositions are generally characterized by relatively low molecular weight, for example, about 3000 (number average molecular weight, measured by gel permeation, polystyrene standard).

Where the polyester is of the crosslinking type, the coating composition contains a crosslinking agent such as the condensate of an amine, amide, urea, melamine or benzoguanamine reacted with formaldehyde. These may be further reacted with alcohol to yield an alkyl ether in which the alkyl groups contain from 1 to 4 carbon atoms.

Coating compositions containing the polyesters of the present invention may contain from 0 to 50 percent by weight of pigments. These pigments can be selected from the class of inorganic or organic pigments, or mixtures thereof. Suitable pigments might typically include titanium dioxide, zinc oxide, cadmium sulfide, iron oxide, chromium oxide, carbon black, and the like. Fillers and extenders such as silica, clays, talc, barium sulfate, calcium carbonate, and the like may also be included.

In addition to water, the polyester composition may be thinned with organic solvents, if desired. Acid catalysts, for example, dinonylnaphthalene sulfonic acid and dinonylnaphthalenedisulfonic acid, may also be used to aid in curing the coating composition. Defoamers and surfactants may also be present as needed to release air and achieve desired wetting during application.

The coating composition of the present invention may be applied onto a variety of substrates using conventional application techniques, including spray, disc, roll-coating, dip, and brush application.

The present invention is further illustrated by the following non-limiting examples. All measurements are reported in weight percent unless otherwise noted.

Example 1

| Charge | Reactants | Wt. (grams) | Equivalents | Moles |
|---|---|---|---|---|
| A | Phthalic anhydride | 444.0 | 6.00 | 3.00 |
| B | Diethylene glycol | 254.4 | 4.80 | 2.40 |
| C | Trimethylol propane | 214.6 | 4.80 | 1.60 |
| D | Triphenyl phosphite | 2.30 | | |
| E | Dibutyl tin oxide | 1.60 | | |
| F | Octenyl succinic anhydride | 250.0 | 1.20 | 1.20 |

Charges (A), (B), (C), (D) and (E) were charged into a three-liter, four-necked, round bottom flask equipped with a motor-driven, stainless steel paddle agitator, a thermocouple to record batch temperature, a Dean-Stark water trap connected with a condenser to collect distillate evolved, and an inert gas sparge tube. Heat was applied to a Glas-Col heating mantle and the temperature was gradually increased to 220° C. and held until an acid value of less than four was obtained. The contents of the flask were cooled to 85° C. and material (F) was charged to the flask. Heating was resumed and temperature was increased to 110° C. and held until IR indicated disappearance of the anhydride band, yielding an acid value of approximately sixty. The polymer was thinned to 85% solids in butyl Cellosolve. The same procedure was used for the syntheses of Examples 2 through 10.

| Charge | Reactants | Wt. (grams) | Equivalents | Moles |
|---|---|---|---|---|
| Example 2 | | | | |
| A | Phthalic anhydride | 444.0 | 6.00 | 3.00 |
| B | Diethylene glycol | 254.4 | 4.80 | 2.40 |
| C | Trimethylol propane | 214.6 | 4.80 | 1.60 |
| D | Triphenyl phosphite | 2.30 | | |
| E | Dibutyl tin oxide | 1.60 | | |
| F | Hexahydrophthalic anhydride | 196.7 | 1.28 | 1.28 |
| Example 3 | | | | |
| A | Phthalic anhydride | 444.0 | 6.00 | 3.00 |
| B | Diethylene glycol | 254.4 | 4.80 | 2.40 |
| C | Trimethylol propane | 214.6 | 4.80 | 1.60 |
| D | Triphenyl phosphite | 2.30 | | |
| E | Dibutyl tin oxide | 1.60 | | |
| F | Phthalic anhydride | 177.6 | 1.20 | 1.20 |
| EXAMPLE 4 | | | | |
| A | Phthalic anhydride | 444.0 | 6.00 | 3.00 |
| B | Diethylene glycol | 254.4 | 4.80 | 2.40 |
| C | Trimethylol propane | 214.6 | 4.80 | 1.60 |
| D | Triphenyl phosphite | 2.30 | | |
| E | Dibutyl tin oxide | 1.60 | | |
| F | Trimellitic anhydride | 147.4 | 1.49 | 0.745 |
| EXAMPLE 5 | | | | |
| A | Phthalic anhydride | 444.0 | 6.00 | 3.00 |
| B | Diethylene glycol | 254.4 | 4.80 | 2.40 |
| C | Trimethylol propane | 214.6 | 4.80 | 1.60 |
| D | Triphenyl phosphite | 2.30 | | |
| E | Dibutyl tin oxide | 1.60 | | |
| F | Succinic anhydride | 126.2 | 1.25 | 1.25 |
| EXAMPLE 6 | | | | |
| A | Phthalic anhydride | 444.0 | 6.00 | 3.00 |
| B | Diethylene glycol | 254.4 | 4.80 | 2.40 |
| C | Trimethylol propane | 214.6 | 4.80 | 1.60 |
| D | Triphenyl phosphite | 2.30 | | |
| E | Dibutyl tin oxide | 1.60 | | |
| F | Tetrahydrophthalic anhydride | 158.1 | 0.99 | 0.99 |
| EXAMPLE 7 | | | | |
| A | Phthalic anhydride | 444.0 | 6.00 | 3.00 |
| B | Diethylene glycol | 254.4 | 4.80 | 2.40 |
| C | Trimethylol propane | 214.6 | 4.80 | 1.60 |
| D | Triphenyl phosphite | 2.30 | | |
| E | Dibutyl tin oxide | 1.60 | | |
| F | Methyl succinic anhydride | 135.0 | 0.92 | 0.92 |
| EXAMPLE 8 | | | | |
| A | Phthalic anhydride | 296.0 | 4.00 | 2.00 |
| B | Diethylene glycol | 169.6 | 3.20 | 1.60 |
| C | Trimethylol propane | 214.6 | 3.20 | 1.07 |
| D | Triphenyl phosphite | 1.50 | | |
| E | Dibutyl tin oxide | 1.10 | | |

| Charge | Reactants | Wt. (grams) | Equivalents | Moles |
|---|---|---|---|---|
| F | 4-(4-Methyl-3-pentyl)-4-cyclohexene-1,2-dicarboxylic anhydride | 174.0 | 0.56 | 0.56 |
| | EXAMPLE 9 | | | |
| A | Phthalic anhydride | 1491.8 | 20.2 | 10.1 |
| B | Diethylene glycol | 1669.5 | 31.6 | 15.8 |
| C | Triphenyl phosphite | 7.9 | | |
| D | Dibutyl tin oxide | 5.7 | | |
| F | Hexahydrophthalic anhydride | 490.8 | 3.19 | 3.19 |
| | EXAMPLE 10 | | | |
| A | Tall oil fatty acid | 560.0 | 2.00 | 2.00 |
| B | Isophthalic acid | 332.0 | 4.00 | 2.00 |
| C | Trimethylol propane | 469.4 | 10.5 | 3.50 |
| D | Triphenyl phosphite | 3.40 | | |
| E | Dibutyl tin oxide | 2.50 | | |
| F | Hexahydrophthalic anhydride | 206.7 | 1.34 | 1.34 |

In Examples 11 and 12, charges (A), (B), (C), (D), (E) and (F) were charged into a three-liter, four-necked, round bottom flask equipped with a motor-driven, stainless steel paddle agitator, a thermocouple to record batch temperature, a Dean-Stark water trap connected with a condenser to collect distillate evolved, and an inert gas sparge tube. Heat was applied to a Glas-Col heating mantle and the temperature was gradually increased to 220° C. and held until an acid value of less than four was obtained. The contents of the flask were cooled to 85° C. and material (G) was charged to the flask. Heating was resumed and temperature was increased to 110° C. and held until IR indicated disappearance of the anhydride band, yielding an acid value of approximately sixty.

| Charge | Reactants | Wt. (grams) | Equivalents | Moles |
|---|---|---|---|---|
| | Example 11 | | | |
| A | Cyclohexane dicarboxylic acid | 352.6 | 4.10 | 2.05 |
| B | Isostearic acid | 312.4 | 1.10 | 1.10 |
| C | Trimethylol propane | 411.7 | 9.21 | 3.07 |
| D | "Dimer Diol"* | 268.5 | 1.00 | 0.50 |
| E | Triphenyl phosphite | 3.50 | | |
| F | Dibutyl tin oxide | 2.40 | | |
| G | Octenyl succinic anhydride | 379.8 | 1.81 | 1.81 |
| | EXAMPLE 12 | | | |
| A | Cyclohexane dicarboxylic acid | 352.6 | 4.10 | 2.05 |
| B | Isostearic acid | 312.4 | 1.10 | 1.10 |
| C | Trimethylol propane | 411.7 | 9.21 | 3.07 |
| D | "Dimer Diol"* | 268.5 | 1.00 | 0.50 |
| E | Triphenyl phosphite | 3.50 | | |
| F | Dibutyl tin oxide | 2.40 | | |
| G | Hexahydrophthalic anhydride | 206.4 | 1.34 | 1.34 |

*"Dimer Diol" is a $C_{36}$ diol available from Henkel-Emery.

In Example 13 charges (A), (B), (C), (D), (E) were charged into a three-liter, four-necked round bottom flask equipped with a motor driven stainless steel paddle agitator, a thermocouple to record batch temperature, a Dean Stark water trap connected with a condenser to collect distillate evolved, and an inert gas sparge tube. Heat was applied to a Glas-Col heating mantle and the temperature was gradually increased to 220° C. and held until an acid value of approximately fifty was obtained.

EXAMPLE 13

| Charge | Reactants | Wt. (grams) | Equivalents | Moles |
|---|---|---|---|---|
| A | Adipic acid | 730.0 | 10.00 | 5.00 |
| B | Diethylene glycol | 424.0 | 8.00 | 4.00 |
| C | Trimethylol propane | 201.2 | 4.50 | 1.50 |
| D | Triphenyl phosphite | 3.4 | | |
| E | Dibutyl tin oxide | 2.4 | | |

TESTS FOR SAPONIFICATION RESISTANCE

Base master batch clear coating compositions incorporating the resins from each of the synthesis examples above were made using the following formulation:

140 grams of resin solids 60 grams of Cymel 303

1.8 grams of a 55% solution of dinonylnaphthalene disulfonic acid ("Nacure 155" from King Industries)

Dimethyl ethanolamine (DMEA) to pH of 7.80 (+/− 0.20)

Deionized water

Each formulation was divided into two groups, Group A and Group B. Group A was tested for pH drop with the initial neutralization indicated above. Group B was provided with a higher initial pH by adding more DMEA to bring the pH to 8.45 (+/−0.20).

Table I presents data for amounts of DMEA and water for the initial master batch and initial pH's and pH drops after one week at 120° F. of both splits of the master batch.

The table shows the greater pH stability (decrease in magnitude of pH drop) by using compositions of the current invention.

TABLE I

| | Group A | | | | Group B | |
|---|---|---|---|---|---|---|
| Example | DMEA (grams) | Water (grams) | Initial pH | pH Drop | Initial pH | pH Drop |
| 1 | 14.15 | 116.3 | 7.78 | 0.40 | 8.26 | 0.68 |
| 2 | 15.6 | 116.3 | 7.85 | 0.45 | 8.34 | 0.69 |
| 3 | 13.0 | 116.3 | 7.98 | 1.27 | 8.60 | 1.63 |
| 4 | 18.0 | 116.3 | 7.95 | 1.38 | 8.47 | 1.79 |
| 5 | 11.55 | 116.3 | 7.96 | 1.12 | 8.63 | 1.73 |
| 6 | 14.0 | 116.3 | 7.81 | 0.37 | 8.30 | 0.66 |
| 7 | 14.95 | 116.3 | 7.77 | 0.69 | 8.45 | 1.26 |
| 8 | 13.0 | 90.0 | 7.89 | 0.78 | 8.53 | 1.22 |
| 9 | 12.8 | 90.0 | 7.67 | 0.33 | 8.40 | 0.82 |
| 10 | 10.0 | 116.3 | 7.90 | 0.21 | 8.48 | 0.50 |
| 11 | 9.5 | 116.3 | 7.75 | 0.07 | 8.43 | 0.34 |
| 12 | 9.5 | 116.3 | 7.76 | 0.33 | 8.30 | 0.32 |
| 13 | 7.0 | 90.0 | 7.69 | 0.72 | 8.30 | 1.35 |

It can be seen in Table I that the polyesters made with substitutions on the acidifying agent in accordance with the present invention (Examples 1, 2, 6, and 9–12) provided substantially better stability relative to similar polyesters acidified with compounds that were unsubstituted or with substitutions outside the scope of the present invention. A drop in pH is indicative of saponification, and therefore the significant lowering of the pH with the examples of the present invention is an indication of greater stability. Under the conditions of Group A, the pH drop of the examples of the present invention was less than 0.5, and in Group B less than 1.0. A general, long term objective is to maintain the pH above about 7.0.

The present invention has been described in connection with particular embodiments, but it should be understood that the invention as defined by the claims encompasses variations and modifications that are known to those of skill in the art.

We claim:

1. A water dispersion of a polyester which is the reaction product of:
   - at least one polycarboxylic acid or anhydride and at least one polyhydric alcohol reacted so as to provide the polyester with hydroxyl functionality,
   - a portion of the hydroxyl functionality being reacted with a substituted polycarboxylic acid or substituted anhydride to form half ester groups in sufficient quantity to provide the polyester with an initial acid number of at least 40, the polycarboxylic or anhydride substitution being selected from alkenyl groups having at least four carbon atoms.

2. The polyester of claim 1 wherein the substituted anhydride is substituted with a straight chain hydrocarbon alkenyl group having at least five carbon atoms.

3. The polyester of claim 2 wherein the alkenyl group has more than six carbon atoms.

4. The polyester of claim 3 wherein the alkenyl group includes octenyl group.

5. The polyester of claim 4 wherein the substituted anhydride comprises a substituted succinic anhydride.

6. The polyester of claim 1 wherein a sufficient portion of the acid groups are neutralized with a base to render the polyester water soluble.

7. The polyester of claim 1 wherein the initial acid number is greater than 50.

8. The polyester of claim 1 wherein the polyhydric alcohol and polycarboxylic acid or anhydride are reacted in proportions so as to provide an equivalent ratio of hydroxyl groups to carboxyl groups greater than 1.0.

9. The polyester of claim 8 wherein the equivalent ratio of hydroxyl groups to carboxyl groups is from 6:1 to 1.5:1.

10. The polyester of claim 8 wherein the equivalent ratio of hydroxyl groups to carboxyl groups is from 4.5:1 to 2.5:1.

11. A water dispersion of a hydroxyl functional polyester acidified to an initial acid number of at least 40 with a polycarboxylic acid or anhydride wherein at least a portion of the acid groups are adjacent to a carbon having substituted thereon a substitution comprising alkenyl groups having at least four carbon atoms.

12. The polyester of claim 11 wherein the substitution is a straight chain hydrocarbon alkenyl group having at least five carbon atoms.

13. The polyester of claim 12 wherein the alkenyl group has more than six carbon atoms.

14. The polyester of claim 12 wherein the alkenyl group includes octenyl group.

15. The polyester of claim 11 comprising a reaction product of a substituted anhydride and a hydroxyl functional polyester.

16. A water dispersion of a hydroxyl functional polyester acidified to an initial acid number of at least 40 with a polycarboxylic acid or anhydride wherein at least a portion of the acid groups are adjacent to a carbon having substituted thereon an alkenyl substitution that yields saponification resistance of a degree that pH of a water dispersion of the polyester falls less than 0.5 from an initial pH of about 7.8 after one week at 120° F.

* * * * *